US009271612B2

(12) United States Patent
Miller

(10) Patent No.: US 9,271,612 B2
(45) Date of Patent: Mar. 1, 2016

(54) DISPENSING DEVICE

(71) Applicant: Spencer D Miller, Sunnyvale, CA (US)

(72) Inventor: Spencer D Miller, Sunnyvale, CA (US)

( * ) Notice: Subject to any disclaimer, the term of this patent is extended or adjusted under 35 U.S.C. 154(b) by 131 days.

(21) Appl. No.: 13/925,063

(22) Filed: Jun. 24, 2013

(65) Prior Publication Data

US 2014/0375458 A1 Dec. 25, 2014

(51) Int. Cl.

| | |
|---|---|
| ***G05B 23/02*** | (2006.01) |
| ***G08B 1/08*** | (2006.01) |
| ***B60Q 1/22*** | (2006.01) |
| ***B65G 47/14*** | (2006.01) |
| ***G07F 11/00*** | (2006.01) |
| ***A47K 10/24*** | (2006.01) |
| ***A47K 5/12*** | (2006.01) |
| ***G08B 21/24*** | (2006.01) |

(52) U.S. Cl.

CPC ............ *A47K 5/1217* (2013.01); *G08B 21/245* (2013.01)

(58) Field of Classification Search

USPC .............................................................. 222/1

See application file for complete search history.

(56) References Cited

U.S. PATENT DOCUMENTS 6,956,498 B1 * 10/2005 Gauthier .................. G08B 1/08 236/12.12
2006/0093161 A1 * 5/2006 Falcon .......................... 381/104
2007/0222622 A1 * 9/2007 Sweeney .................... 340/573.1
2010/0134299 A1 * 6/2010 Fitzgerald et al. .......... 340/573.1
2010/0188222 A1 * 7/2010 Irmscher et al. ........... 340/568.2
2010/0315244 A1 * 12/2010 Tokhtuev et al. ............. 340/603
2011/0017769 A1 * 1/2011 Ophardt ............................ 222/1
2011/0057799 A1 * 3/2011 Taneff ........................ 340/573.1

* cited by examiner

*Primary Examiner* — Jennifer Mehmood
*Assistant Examiner* — Pameshanand Mahase
(74) *Attorney, Agent, or Firm* — Donald R. Boys; Central Coast Patent Agency, Inc

(57) ABSTRACT

A dispensing device has a downward-facing outlet for dispensing a material, a mechanism causing material to be dispensed, a first sensor facing in a first horizontal direction, adapted to detect a person approaching the dispensing device, and an alert mechanism. The first sensor, detecting an approaching person, activates the alert mechanism, signaling the approaching person of the presence of the dispensing device.

14 Claims, 6 Drawing Sheets

DISPENSING DEVICE

BACKGROUND OF THE INVENTION

1. Field of the Invention

The present invention is in the field of dispensers and pertains more particularly to a device for monitoring dispenser usage.

2. Description of Related Art

Proper hand hygiene is a key infection control agenda in preventing the spread of healthcare-associated infections. Current methods commonly use manual observational studies to track and monitor the rate of hand hygiene, which involve watching and recording the hand hygiene behavior of users, and writing down the observed results. However such direct surveillance methods are costly and time consuming. Based on low compliance rates and inaccurate tracking methods, there is clearly a need for a better way to monitor and improve hand hygiene compliance. A device is needed that is capable of influencing the behavior of persons who should practice proper hygiene, and that may also be capable in some cases of electronically recording results.

BRIEF SUMMARY OF THE INVENTION

In one embodiment of the invention dispensing device is provided comprising a downward-facing outlet for dispensing a material, a mechanism causing material to be dispensed, a first sensor facing in a first horizontal direction, adapted to detect a person approaching the dispensing device, and an alert mechanism. The first sensor, detecting an approaching person, activates the alert mechanism, signaling the approaching person of the presence of the dispensing device.

In one embodiment the device further comprises an electronically-activated valve controlling the downward-facing outlet and a second sensor positioned to sense a user's hands in position to accept material dispensed, wherein the second sensor, detecting the person's hands, activates the electronically-activated valve, dispensing a preset amount of material.

Also in one embodiment the device further comprises a side-facing third sensor adapted to sense a person passing by the device to one side. Also in an embodiment the device further comprises a processor with a coupled data repository, the processor coupled to the valve-controlled outlet, to the sensors, and to the alert mechanism, wherein the processor executes one or more coded instructions to sense approach of the person, activate the alert mechanism, activate the valve-controlled outlet to dispense material for a pre-set time in an event the person activates the third sensor, whether or not the person activates the second sensor, records these events if and as they occur, and activates the data-reporting mechanism to report the recorded events to the remote destination.

In another embodiment the processor, executing the instructions, in the event a person is sensed by the third sensor passing without having activated the second sensor, activates an audio or visual alarm, or both. Also in an embodiment the processor, following the coded instructions, records events as they occur, and periodically transfers data regarding the events by a network interface. In some cases the network interface is a local area network (LAN) interface, a wide area network (WAN) interface, or a wireless interface.

In another aspect of the invention a system is provided comprising a dispensing device comprising a downward-facing valve-controlled outlet for a dispensing material, a first sensor facing in a first horizontal direction, adapted to detect a person approaching the dispensing device, a second sensor facing in a horizontal direction at a right angle to the first direction, adapted to sense the person passing by the dispensing device, a third sensor facing downward, adapted to sense the person's hands in position to accept material dispensed from the dispensing device, an alert mechanism, a data repository adapted to store data and instructions, a data-reporting mechanism adapted to send data to a destination remote from the dispensing device, and a processor coupled to the valve-controlled outlet, to the sensors, to the alert mechanism and to the data repository. The processor executes one or more coded instructions to sense approach of the person, activate the alert mechanism, activate the valve-controlled outlet to dispense material for a pre-set time in an event the person activates the third sensor, whether or not the person activates the second sensor, records these events if and as they occur, and activates the data-reporting mechanism to report the recorded events over a network connection to a remote server having a coupled data repository.

In one embodiment of the system the remote server, executing coded instructions from a non-transitory physical medium, prepares reports regarding the recorded events, and makes the reports available for download by authorized persons.

In another aspect of the invention a sensing and processing device is provided comprising a first sensor facing in a first horizontal direction, adapted to detect a person approaching the processing device, an alert mechanism, and an attachment interface adapted to join the processing device to a dispensing device. The first sensor, detecting an approaching person, activates the alert mechanism, signaling the approaching person of the presence of the dispensing device.

In one embodiment the sensing and processing device further comprises a second sensor positioned, with the sensing and processing device joined to a dispensing device, to sense a user's hands in position to accept material dispensed. Also in one embodiment the device further comprises a side-facing third sensor adapted to sense a person passing by the device to one side. In yet another embodiment the device further comprises a processor with a coupled data repository, the processor coupled to the valve-controlled outlet, to the sensors, and to the alert mechanism, wherein the processor executes one or more coded instructions to sense approach of the person, activate the alert mechanism, activate the valve-controlled outlet to dispense material for a pre-set time in an event the person activates the third sensor, whether or not the person activates the second sensor, records these events if and as they occur, and activates the data-reporting mechanism to report the recorded events to the remote destination.

In still another embodiment of the sensing and processing device the processor, executing the coded instructions, in the event a person is sensed by the third sensor passing without having activated the second sensor, activates an audio or visual alarm, or both. In another embodiment the processor, following the coded instructions, records events as they occur, and periodically transfers data regarding the events by a network interface. In still another embodiment the network interface is a local area network (LAN) interface, a wide area network (WAN) interface, or a wireless interface.

In yet another aspect of the invention a method for influencing hand cleaning behavior is provided, comprising providing a dispensing device having a downward-facing outlet for dispensing a material, a mechanism causing material to be dispensed, a first sensor facing in a forward horizontal direction, adapted to detect a person approaching the dispensing device, and an alert mechanism, placing the dispensing device in a position to direct the first sensor to sense an approaching person, and sensing an approaching person, activating the alert mechanism, signaling the approaching person of the presence of the dispensing device.

BRIEF DESCRIPTION OF SEVERAL VIEWS OF DRAWINGS

DETAILED DESCRIPTION OF THE INVENTION

Figure 1:
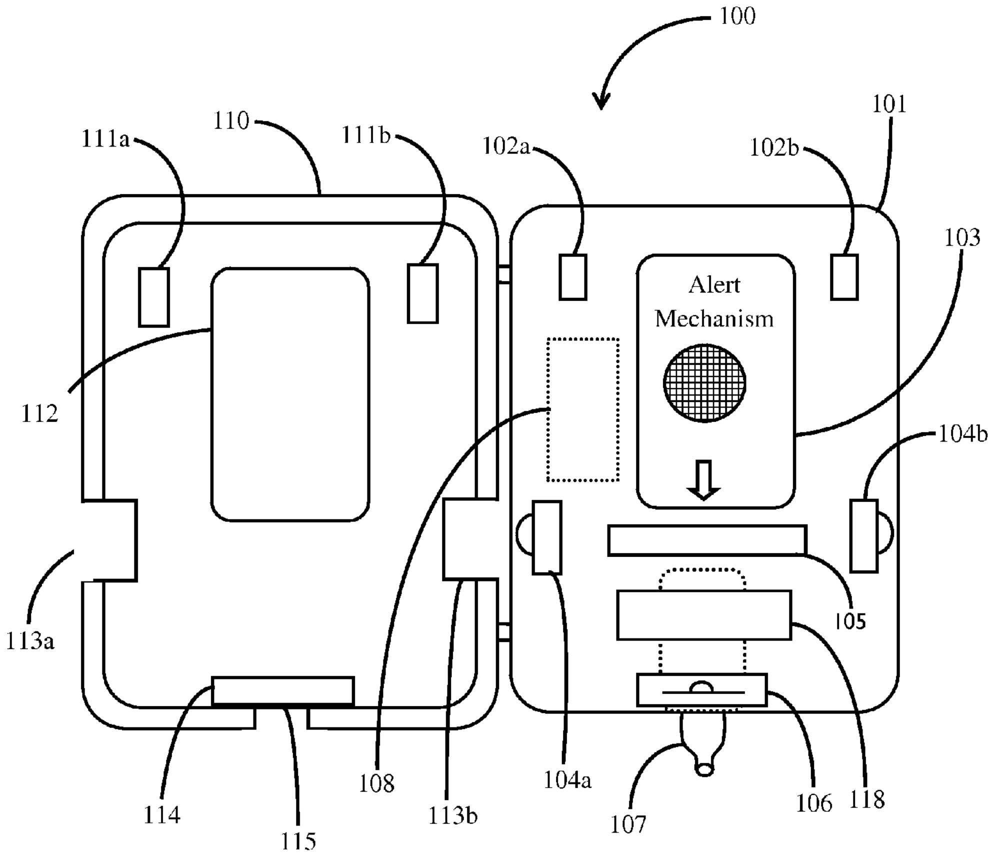
FIG. 1 is an elevation view of a dispensing device, according to an embodiment of the present invention.

FIG. 1 is an elevation view of a dispensing device 100 with a cover plate 110 in an open position, according to an embodiment of the present invention. Dispensing device 100 comprises in this example a pair of first sensors 102*a* and 102*b* facing in a first horizontal direction for detecting a person approaching the dispensing device 100. There are a variety of suitable sensors for accomplishing the purpose of sensors 102*a* and 102*b*, and in some embodiments with certain types of sensors only one sensor may be needed. In this example there are at least two second sensors 104*a* and 104*b* facing in a horizontal direction at a right angle to the first direction, and facing in opposite directions from one another, for sensing the person passing by the dispensing device 100, and in this example a third sensor 106 facing downward for sensing the person's hands in position to accept a material dispensed from the dispensing device 100. The first sensors 101*a* and 102*b* in one embodiment may be a pair of ultrasonic range detection front-facing sensors, the second sensors 104*a* and 104*b* may be in one embodiment a pair of passive infrared lateral proximity sensors and the third sensor 106 in one embodiment may be a passive infrared ventral proximity sensor.

In one embodiment of the present invention, the first sensors, the second sensor and the third sensor herein comprise one of, but are not limited to, ultrasonic sensors, infrared sensors, radio frequency sensors, optical sensors, sound sensors, vibration sensors, and magnetic sensors.

In this example dispensing device 100 comprises a material dispenser 118 equipped with a downward-facing valve-controlled outlet 107 for the dispensing material.

Dispensing device 100 in this example further comprises an alert mechanism 103 for attracting attention to the dispensing device 100. Alert mechanism 103 may be one of an audio alarm or an attention light, or both, to alert position/presence of the dispensing mechanism and to indicate the existence of the downward-facing valve-controlled outlet 108 mounted on the bottom section of dispensing device 100. The attention light may be activated to illuminate in a specific color, such as but not limited to a red, blue, etc. In different embodiments different colors may have different meanings. In one embodiment a particular color is used to indicate compliance. In some embodiments separate lights of different colors may be used to indicate different status, such as alert of compliance.

The dispensing device in this example further comprises a processor 108 coupled to each of the electronic elements of the dispensing device, and managing functions of the dispensing device by executing coded instructions, and may generate an activity report from the activity data and transmit the activity report to a remote destination through a data reporting mechanism 105. The data reporting mechanism 105 may be a Wi-Fi device, Bluetooth sensor, RFID reader, Infrared transmitter, Local Area Network (LAN) port or a Wide Area Network (WAN) port. A central server (not shown) at a remote destination in this example receives either a report prepared by the dispensing device 100, or receives activity data from the device and prepares one or more reports based on the activity data received and stores the data and reports at the remote destination for future analysis. The activity data collected by processor 108 is simultaneously stored in a data repository provided in the dispensing device 100.

Dispensing device 100 is mounted in a housing 101 along with the dispensing material as a single unit. The material in various use cases may be a hand-sanitizing material containing methyl alcohol, or may be a special or commercially-available soap material. The housing 101 may be made of a durable material such as but not limited to molded plastic, metal, wood or a variety of other materials, the suitability of which depends at least in part on cost of manufacture, supply availability, aesthetic reasons or other commercial considerations. Housing 101 is further provided with a hinged cover plate 110 for safeguarding the various components of the dispensing device 100. Cover plate 110 comprises cut-away sections 111*a* and 111*b* for the first sensors 101*a* and 102*b* to expose the sensors for detecting the user approaching from a front side, cut-away sections 113*a* and 113*b* for the second sensors 104*a* and 104*b* to expose the sensors, and a cut away section 114 for the third sensor 104 to expose the sensor for allowing unhindered functioning. Cover plate 110 further comprises a cut-away section 115 for exposing downward-facing valve-controlled outlet 108 for the dispensing material and a cut-away section 112 for the alert mechanism 103. Dispensing device 100 in this example further comprises a power source (not shown). The power source may be hard-wired to the building's electrical wiring. In another embodiment, the power source comprises a plurality of replaceable batteries carried in a suitable compartment in the dispensing device 100.

In some embodiments of the invention some of the elements illustrated and described above may not be present, depending at least in part on intended use.

Figure 2:
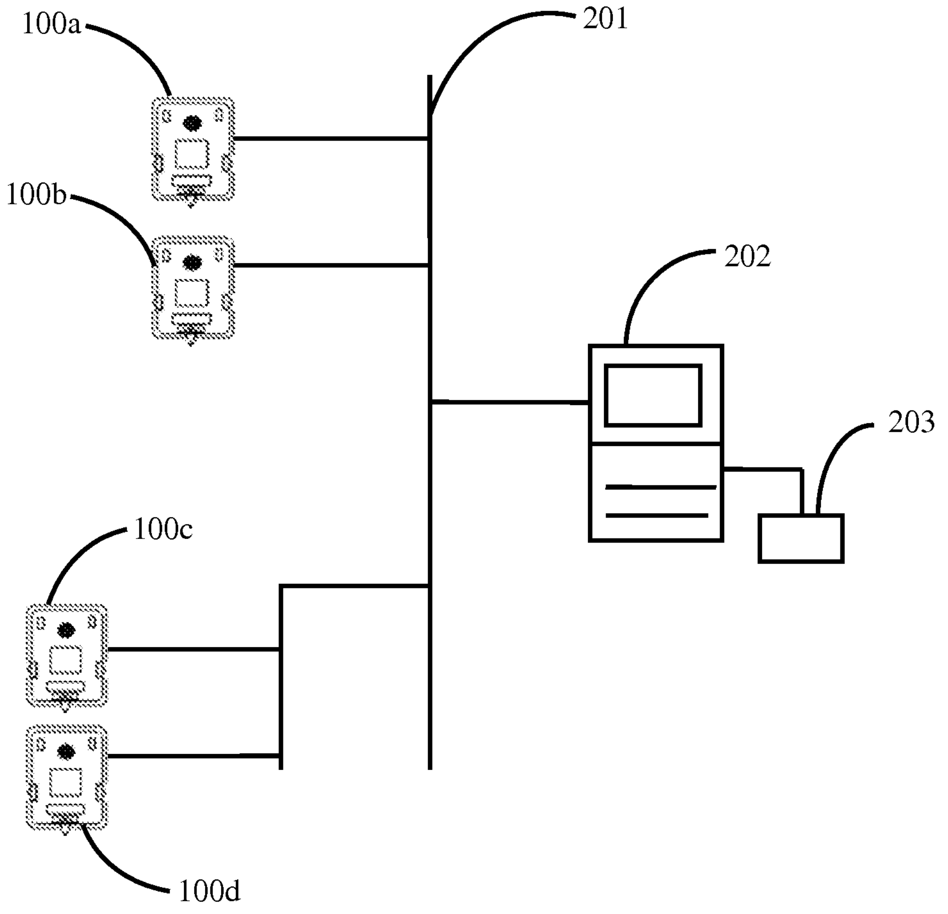
FIG. 2 is a schematic view of a system for monitoring usage of a dispensing device, according to an embodiment of the present invention.

FIG. 2 is a schematic view of a system for monitoring dispensing device usage, according to an embodiment of the present invention. The system comprises a plurality of dispensing devices 100*a*-100*d*, representing any number of such devices, in communication with a remote server 202 over a communication network 201. Remote server 202 is coupled to a data repository 203 in one embodiment, for storing data and reports that are received from the devices over the network, and that may be accessed by authorized users. Dispensing devices 100*a*-100*d* monitor one or more activities associated with dispensing of a material and record the activity data indicating if the operation of the dispensing devices is a successful event or an unsuccessful event. Dispensing devices 100*a*-100*d* transmit the activity data or reports made from the activity data to the remote server 202, and the remote server stores the data and/or reports in the repository. The remote server 202 may generate a report (compliance report) of the various dispensing devices based on the activity data, and store the compliance report in data repository 202 for further analysis, in the event the devices do not generate the reports. Communication network 201 as shown in FIG. 1 may be a local area network (LAN), or any other sort of network, such as a wide area network (WAN), or a wireless network. The activity data associated with operation of the dispensing devices may comprise one of an event indicating a successful dispensing of the material or an event indicating an unsuccessful dispensing of the material. The successful event comprises dispensing the material based on identifying the person's hands below the downward-facing valve-controlled outlet and an unsuccessful event comprises an event defining a non-usage of dispenser device 100 by the user in the proximity of the dispensing device 100.

Figure 3:
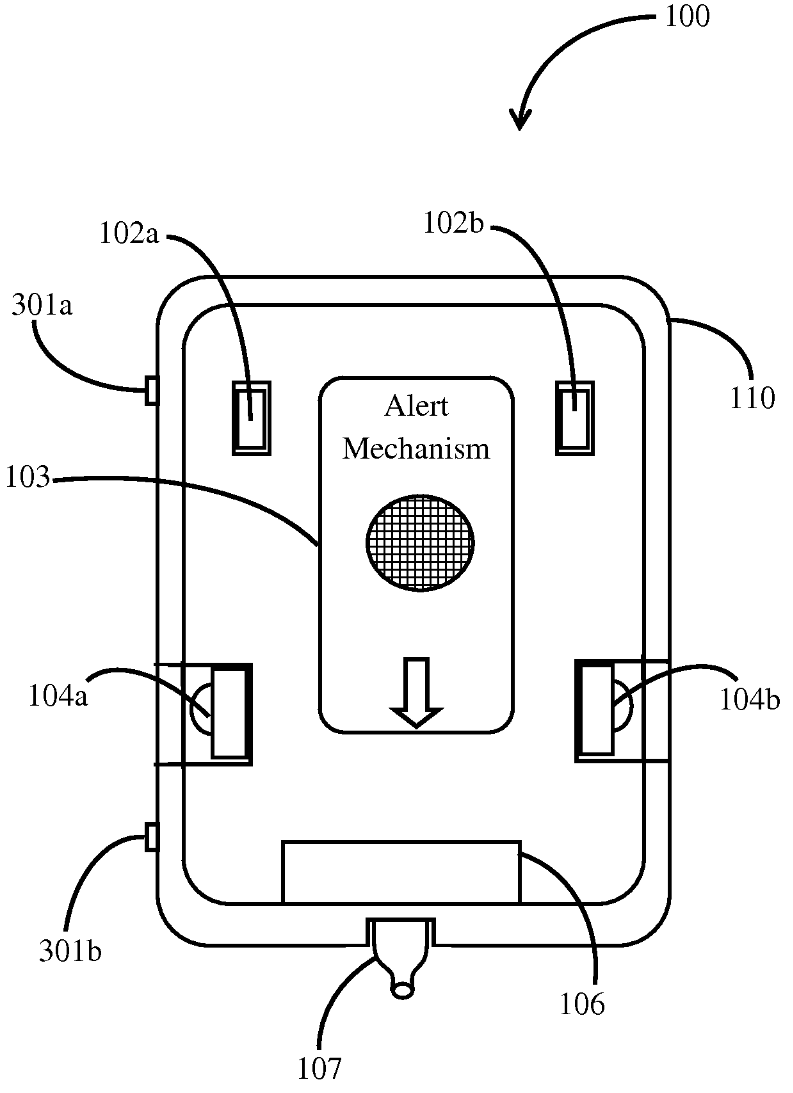
FIG. 3 is an elevation view of a dispensing device with the cover plate in a closed position, according to an embodiment of the present invention.

FIG. 3 is an elevation view of a dispensing device of FIG. 1 with the cover plate in a closed position, according to an embodiment of the present invention. Cover plate 110 in this example has cut-away sections to expose first sensors 102*a* and 102*b* for allowing unhindered functioning, a cut away section to expose a pair of second sensors 104*a* and 104*b* and a cut away section to expose third sensor 106 for allowing unhindered functioning as shown in FIG. 3. Cover plate 110 further comprises a cut away section to expose the downward-facing valve-controlled outlet, a cut away section for the alert mechanism as shown in FIG. 3. The cover plate 110 is fitted to the housing 101 with a pair of hinges 301*a* and 301*b* for allowing a swinging movement. Cover plate 110 in conjunction with the housing makes the dispensing device tamper proof.

Figure 4:
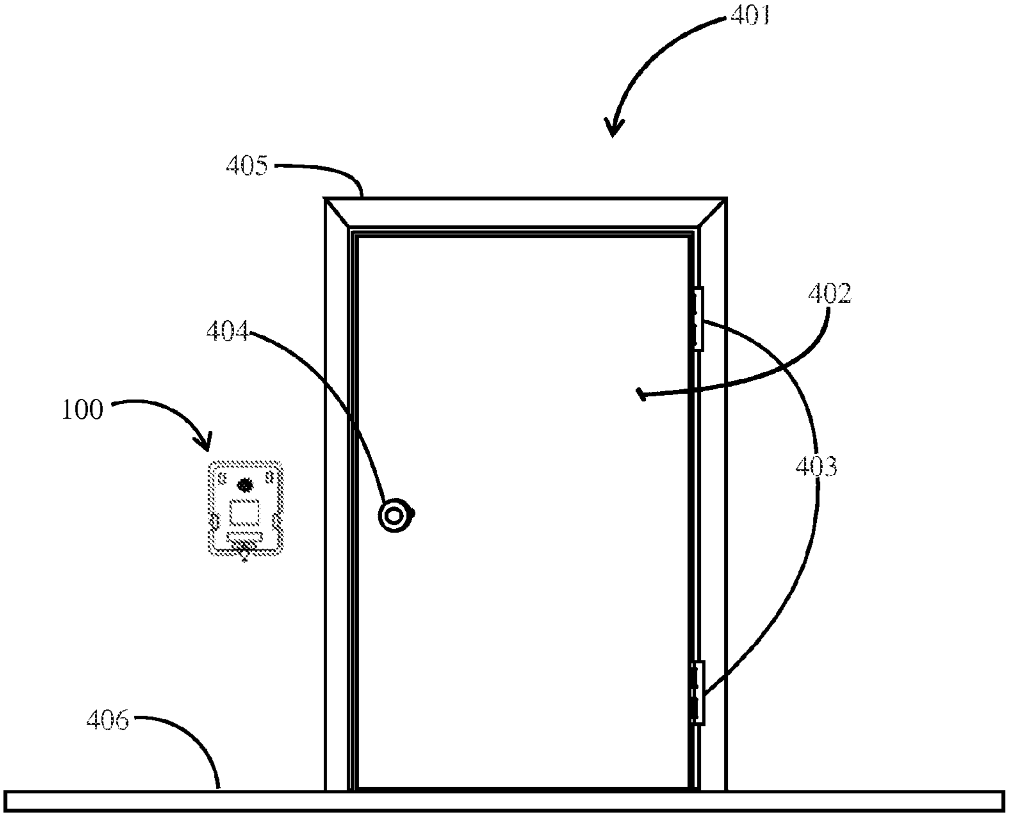
FIG. 4 is an elevation view of the dispensing device mounted on a wall adjacent to a doorway of a building, according to an embodiment of the present invention.

FIG. 4 is an elevation view of dispensing device 100 mounted on a wall adjacent to a doorway 401 of a building, according to an embodiment of the present invention. As shown in FIG. 4, doorway 401 leads from a common floor area 406 into a hospital ward or similar area. A door 402 is mounted on a door mounting frame 405 and hung by a pair of hinges 403 at the right hand side of the door, and there is a door handle 404 at the left hand side of the door 402 for opening of the door 402 by the user. The positioning of the door handle 404 at the left hand side indicates that the door will swing open at the left hand side and the user that approaches the doorway will be sensed by the first sensors.

Figure 5:
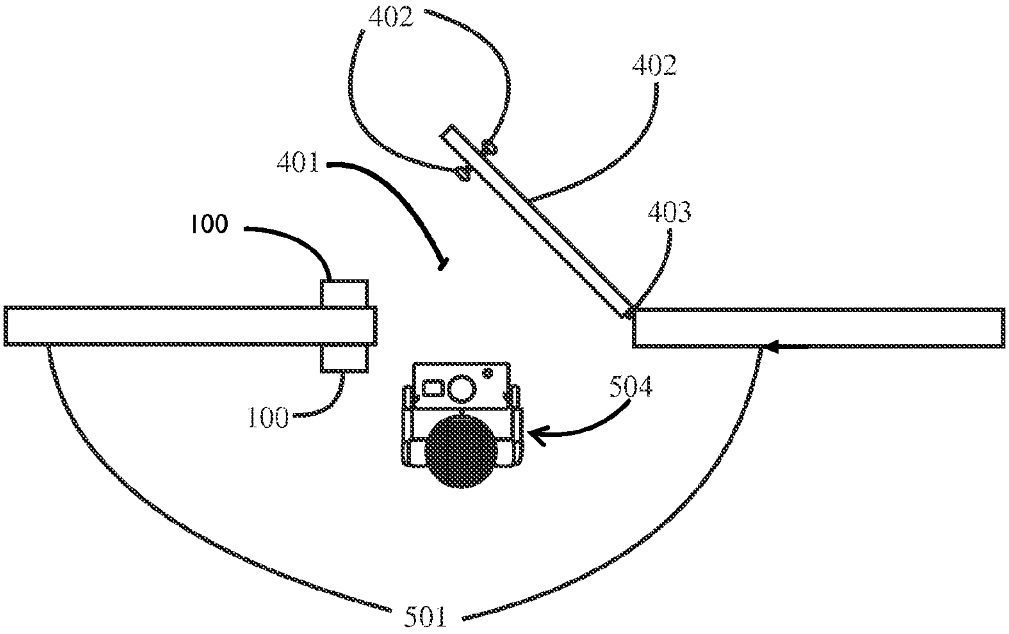
FIG. 5 is a top view of the adjacent walls to the doorway along with a top view of a user entering the doorway, according to an embodiment of the present invention.

FIG. 5 is a top of the adjacent walls to the doorway from FIG. 4 with a user entering the doorway, according to an embodiment of the present invention. User 504 is illustrated as having approached the doorway, where the user would be sensed by the first sensors of device 100, and is now passing through, and will be sensed by one of the side-facing second sensors. A second device 100 is illustrated as mounted on the opposite side of the wall 501 adjacent the doorway. A purpose for the second device in some embodiments stems from the fact that it may be desirable to prevent contaminants on a user's hands from coming into the room, and may also be desirable to prevent contaminants that a user may have picked up in the room from leaving the room on the user's hands.

Figure 6:
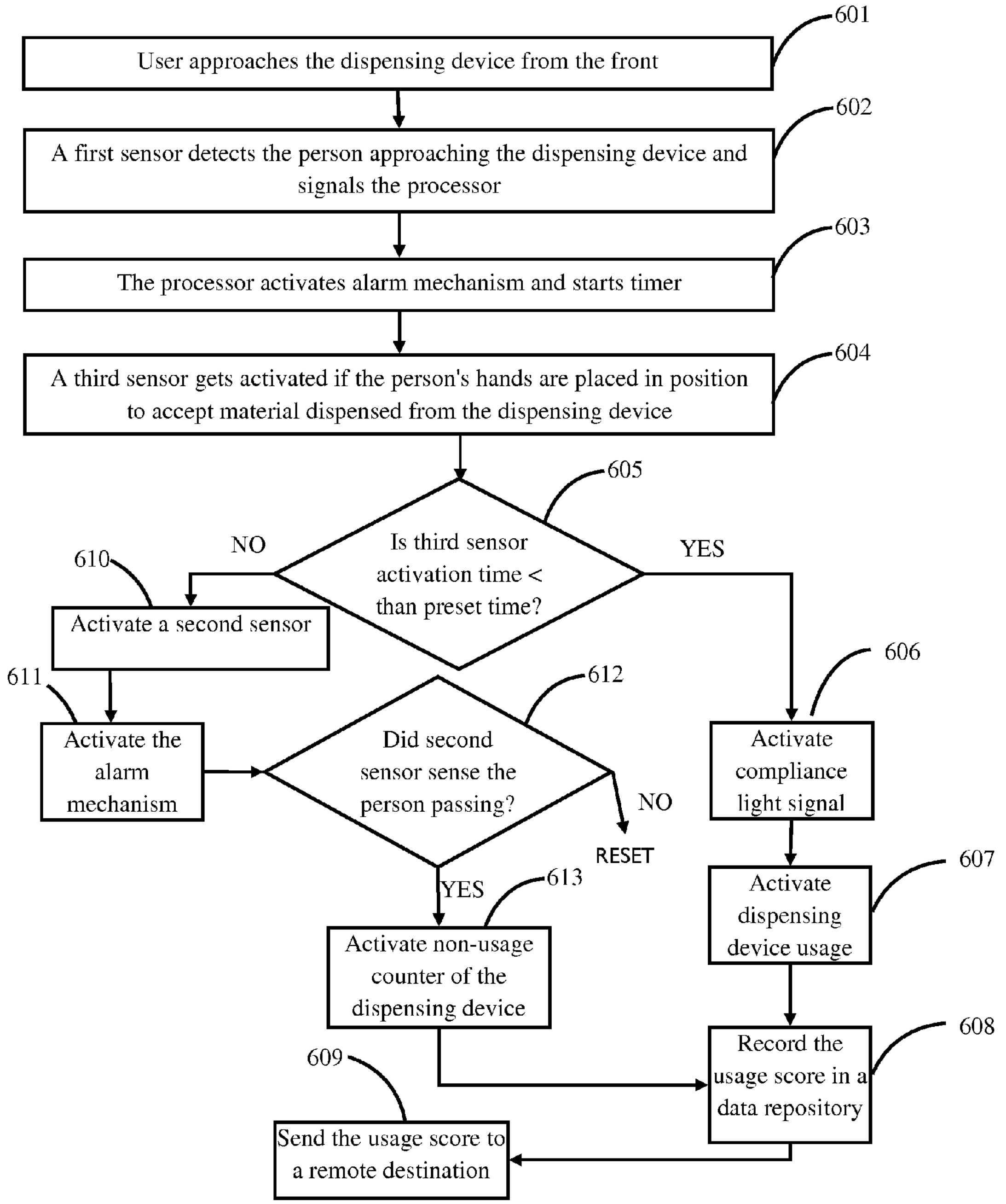
FIG. 6 is a flow chart illustrating an operation of the dispensing device, according to an embodiment of the present invention.

FIG. 6 is a flow chart illustrating an operation of the dispensing device according to one embodiment of the present invention. In this example the user approaches the dispensing device from the front side (step 601). The pair of front-facing sensors detects the user's approach and signals the processor to activate alert mechanism 103 (step 602). The alert may be a light or an audible alarm, or both, the purpose of which is to alert the approaching person that the device is there and hand cleansing is desired or necessary. The processor activates the alert mechanism for alerting the user to use the dispensing device and starts a timer with a preset timeout (step 603). Further, if the user places his or her hands below the valve-controlled outlet, the third sensor gets activated (step 604). At step 605, the third sensor sends activity signals to the processor and the processor checks if the activation time of the third sensor is less than the pre-set time that begins when the user's approach is sensed. If the activation time of the third sensor is less than the preset activation time, that is the user places his hands below the outlet to receive the hand sanitizer before the expiration of the activation time, the third sensor signals the processor to activate a compliance signal, which may be a light of a particular color (step 606). Further, the processor activates a dispenser device usage counter and adds one count to a tally (step 607). The processor records the usage count and may generate an activity report (step 608). The processor then sends the tally score/activity report to the remote destination over a communication network (step 609). This data transmission may be event-by-event, or may be a periodic transmission. There may also be a variety of ways that event recording and reporting may be done, based on the coded instructions followed by processor 108.

If at step 605 it is seen that the third sensor is not activated by the user's hands within the preset time, the processor at step 610 activates one of the second sensors, which may depend on which side of the door the device is mounted. The processor may re-activate the alarm mechanism at step 611, then at step 612 it is determined whether the second sensor has sensed the person passing through the doorway. If NO, then the device may reset based on the assumption that the person approaching has decided not to enter the restricted area. There may be no need in this instance to record any event or data.

If the second sensor senses that the person has passed through the doorway at step 612, then at step 613 the processor records a non-usage event, which is recorded at step 608. The device may be reset at this point.

The examples described above, comprising a variety of sensors, a processor, recording of events, transmission of data and other activities, are for relatively high-end use cases, and it is to be noted that not all of these variations and functions are necessary to practice the invention in some embodiments. In many uses there may not be a network connection, and the device itself may record events and/or prepare reports which may be downloaded from the device by authorized persons through a suitable electronic port, such as a USB port. In some rather minimal embodiments there may be a front-facing sensor arrangement to sense a person's approach, and a switch to trigger an alarm to alert the approaching person that there is a dispensing device that should be used.

In another embodiment of the invention the device of the invention is an add-on device having one or more sensors and an alert mechanism, as well as, in some instances, event recording and transmission capability. This add-on device in this embodiment may be joined to a commercially existing dispensing device, such as a soap dispenser or hand-sanitizer dispenser. Joining may be done in a variety of ways, such as by Velcro™ arrangement, by conventional clamps or fasteners, or in some other fashion.

It will be apparent to a skilled artisan that the embodiments described above are exemplary only, and that there may be many alterations made in these examples without departing from the spirit and scope of the invention. For example, different devices according to the invention may be adapted to incorporate a variety of sensors and may be constructed of a large variety of materials as described above. Different embodiments might also utilize solar power. The alert lights may be light emitting diode displays, incandescent, fluorescent or halogen technologies and therefore any combination of these technologies used should not be construed as a departure from the spirit and scope of the invention.

The invention claimed is:

1. A dispensing device comprising:

a housing including a front face, a back face, a top face, a bottom face and two opposing side faces;

an outlet on the bottom face for dispensing a sanitizing material;

a mechanism causing the sanitizing material to be dispensed;

a first directional sensor electronically coupled to the dispensing device and facing in a first direction substantially orthogonal to the front face to detect only a person approaching the dispensing device from the front;

a second directional sensor electronically coupled to the dispensing device and facing in a second direction substantially at a right angle to the first direction, to detect only a person passing by one of the side faces;and an alert mechanism providing, when activated, a visual or an audible signal;

wherein first sensor, detecting an approaching person, activates the alert mechanism, alerting the approaching person to the presence of the dispensing device, and the second sensor detects the person passing by one of the opposing side faces.

2. The dispensing device of claim 1 further comprising an electronically-activated valve controlling the outlet and a third sensor positioned to sense a user's hands in position to accept material dispensed, wherein the third sensor, detecting the person's hands, activates the electronically-activated valve, dispensing a preset amount of the sanitizing material via the outlet.

3. The dispensing device of claim 2 further comprising a processor with a coupled data repository, the processor coupled to the electronically-activated valve, to each of the sensors, and to the alert mechanism, wherein the processor executes one or more coded instructions to sense approach of the person, activate the alert mechanism, activate the valve-controlled outlet to dispense material for a pre-set time in an event the person activates the third sensor, whether or not the person activates the second sensor, records these events if and as they occur, and activates a data-reporting mechanism to report the recorded events to a remote destination.

4. The dispensing device of claim 3 wherein the processor, executing the instructions, in the event a person is sensed by the second sensor passing without having activated the third sensor, activates an audio or visual alarm, or both, and reports the event to the remote destination.

5. The dispensing device of claim 4 wherein the processor, following the coded instructions, records events as they occur, and periodically transfers data regarding the events by a network interface.

6. The dispensing device of claim 3 wherein the network interface is a local area network (LAN) interface, a wide area network (WAN) interface, or a wireless interface.

7. A system comprising:

a dispensing device comprising a housing including a front face, a back face, a top face, a bottom face and two opposing side faces, a downward-facing valve-controlled outlet for dispensing a sanitizing material, a first directional sensor coupled to the dispensing device and facing in a first direction substantially orthogonal to the front face to detect only a person approaching the dispensing device from the front, a second directional sensor coupled to the dispensing device and facing in a second direction substantially at a right angle to the first direction, to detect only a person passing by one of the opposing side faces, a third sensor oriented to sense a person's hands in position to accept material dispensed from the dispensing device via a valve-controlled outlet, an alert mechanism providing when activated a visual or an audible signal, a data repository adapted to store data and instructions, a data-reporting mechanism adapted to send data to a destination remote from the dispensing device, and a processor coupled to the valve-controlled outlet, to the sensors, to the alert mechanism and to the data repository;

wherein the processor executes one or more coded instructions to sense approach of a person, activate the alert mechanism, activate the valve-controlled outlet to dispense material for a pre-set time in an event the person activates the third sensor, whether or not the person activates the second sensor, records these events if and as they occur, and activates a data-reporting mechanism to report the recorded events over a network connection to a remote server having a coupled data repository.

8. The system of claim 7 wherein the remote server, executing coded instructions from a non-transitory physical medium, prepares reports regarding the recorded events, and makes the reports available for download by authorized persons.

9. A sensing and processing device comprising:

a first directional sensor facing in a first direction to detect only a person approaching a dispensing device;

a second directional sensor facing in a second direction to sense a user's hands in position to accept material dispensed from the dispensing device;

a third directional sensor facing in a third direction to detect only a person passing by the dispensing device to one side; and an alert mechanism providing when activated a visual or an audible signal;

wherein the first directional sensor, detecting an approaching person, activates the alert mechanism, alerting the approaching person to the presence of the dispensing device.

10. The sensing and processing device of claim 9 further comprising a processor with a coupled data repository, the processor coupled to a valve-controlled outlet, to all of the sensors, and to the alert mechanism, wherein the processor executes one or more coded instructions to sense approach of a person, activate the alert mechanism, activate the valve-controlled outlet to dispense material for a pre-set time in an event the person activates the second sensor, whether or not the person activates the third sensor, records these events if and as they occur, and activates the data-reporting mechanism to report the recorded events to the remote destination.

11. The sensing and processing device of claim 10 wherein the processor, executing the coded instructions, in the event a person is sensed by the third sensor passing without having activated the second sensor, activates an audio or visual alarm, or both.

12. The sensing and processing device of claim 11 wherein the processor, following the coded instructions, records events as they occur, and periodically transfers data regarding the events by a network interface.

13. The sensing and processing device of claim 12 wherein the network interface is a local area network (LAN) interface, a wide area network (WAN) interface, or a wireless interface.

14. A method for influencing hand cleaning behavior, comprising:

(a) providing a dispensing device having a downward-facing outlet for dispensing a sanitizing material, a mechanism causing the sanitizing material to be dispensed, a first directional sensor facing in a first direction to detect only a person approaching the dispensing device, a second directional sensor detecting when a person's hands are in position to receive the material, a third directional sensor facing in a second direction to detect only when the person passes by the dispensing device, and an alert mechanism;

(b) placing the dispensing device proximate a doorway with the third directional sensor facing toward the doorway;

(c) sensing an approaching person, activating the alert mechanism, signaling the approaching person of the presence of the dispensing device;

(d) detecting, by signal from the second directional sensor, if the person passes by the dispensing device and whether or not the third directional sensor was activated; and (e) in the event that the second directional sensor detects the person passes by the dispensing device without activating the third directional sensor, activates an audio or visual alarm, or both.

* * * * *